(12) United States Patent
Abello et al.

(10) Patent No.: US 11,196,997 B2
(45) Date of Patent: Dec. 7, 2021

(54) IMAGE COMPRESSION

(71) Applicant: Hewlett-Packard Development Company, L.P., Houston, TX (US)

(72) Inventors: Lluis Abello, Tarragona (ES); Albert Serra, Terrassa (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 497 days.

(21) Appl. No.: 15/570,234

(22) PCT Filed: May 15, 2015

(86) PCT No.: PCT/EP2015/060786
§ 371 (c)(1),
(2) Date: Oct. 27, 2017

(87) PCT Pub. No.: WO2016/184485
PCT Pub. Date: Nov. 24, 2016

(65) Prior Publication Data
US 2018/0139446 A1    May 17, 2018

(51) Int. Cl.
| H04N 19/60 | (2014.01) |
| H04N 19/132 | (2014.01) |
| H04N 19/176 | (2014.01) |
| H04N 19/186 | (2014.01) |
| H04N 19/12 | (2014.01) |
| H04N 19/136 | (2014.01) |

(52) U.S. Cl.
CPC .......... *H04N 19/132* (2014.11); *H04N 19/12* (2014.11); *H04N 19/136* (2014.11); *H04N 19/176* (2014.11); *H04N 19/186* (2014.11); *H04N 19/60* (2014.11)

(58) Field of Classification Search
None
See application file for complete search history.

(56) References Cited

U.S. PATENT DOCUMENTS

| 5,282,255 A * | 1/1994 | Bovik ............... H04N 19/94 375/240.01 |
| 5,369,418 A | 11/1994 | Richards |
| 5,438,635 A | 8/1995 | Richards |

(Continued)

FOREIGN PATENT DOCUMENTS

| CN | 102497489 A | 6/2012 |
| CN | 103402091 A | 11/2013 |

(Continued)

OTHER PUBLICATIONS

Tailor et al.; "Color-opponent Receptive Fields Derived From Independent Component Analysis of Natural Images"; Vision Research 40; Sep. 2000; pp. 2671-2676.

*Primary Examiner* — Mohammad J Rahman
(74) *Attorney, Agent, or Firm* — "HP Inc. Patent Department"

(57) ABSTRACT

A number of colors in a predefined region of an image to be compressed are determined. The predefined region has a plurality of pixels. In response to determining that the number of colors is greater than a first predefined threshold, a lossy compression process is selected dependent on a number of pixels in the predefined region having a predefined color. The selected lossy compression process is applied to the predefined region.

15 Claims, 7 Drawing Sheets

(56) References Cited

U.S. PATENT DOCUMENTS

| | | | | |
|---|---|---|---|---|
| 5,999,710 | A * | 12/1999 | Smith | G06K 15/12 358/1.13 |
| 6,021,227 | A * | 2/2000 | Sapiro | H04N 1/417 358/426.02 |
| 6,289,118 | B1 | 9/2001 | Cossey et al. | |
| 7,701,492 | B2 | 4/2010 | Motomura et al. | |
| 8,363,984 | B1 * | 1/2013 | Goldman | G06T 3/0012 382/298 |
| 8,817,075 | B2 | 8/2014 | Nakajima et al. | |
| 2005/0244065 | A1 * | 11/2005 | Malvar | G06K 9/36 382/239 |
| 2006/0279813 | A1 * | 12/2006 | Ozawa | H04N 1/46 358/538 |
| 2007/0286507 | A1 * | 12/2007 | Mori | H04N 19/60 382/239 |
| 2008/0037882 | A1 * | 2/2008 | Tamura | H04N 19/172 382/232 |
| 2010/0183223 | A1 * | 7/2010 | Matsuoka | H04N 1/56 382/166 |
| 2011/0188747 | A1 * | 8/2011 | Ogura | G06K 9/36 382/166 |
| 2014/0029024 | A1 | 1/2014 | Shaham et al. | |

FOREIGN PATENT DOCUMENTS

| | | |
|---|---|---|
| CN | 103458242 A | 12/2013 |
| CN | 103886623 A | 6/2014 |

* cited by examiner

IMAGE COMPRESSION

BACKGROUND

Images obtained, e.g., by an image capturing device, such as a digital camera or a scanner, or generated by a computer device may be compressed to reduce storage demand for storing the images or to reduce bandwidth demand for a transfer of the images over a communication link.

DRAWINGS

FIG. 3 shows an example of an interpolation compression mode, wherein

FIG. 4 shows an example of a clustering compression mode, wherein FIG. 4(a) shows an original 4×4 RGB pixel cell with 16 pixels, and wherein

FIG. 5 shows an example of a block truncation compression mode, wherein FIG. 5(a) schematically shows an original cell split into top half and bottom half, and wherein FIG. 5(b) schematically shows an original cell split into left half and right half.

DESCRIPTION

A compression of images, e.g., continuous tone images, may be used in printing workflows to reduce the storage and bandwidth demand to transfer rasterized pages before they are processed by a printer pipeline. Images to be sent to the printer by a printer driver or an external raster image processor (RIP) may be compressed to reduce transmission time. Print jobs and print pages may be stored to a storage device, like a disc, for queuing and re-printing. Such print jobs and print pages may be compressed to reduce the read/write time from/to the storage device and the storage space demand.

Compression processes applied to an image may comprise a lossless compression process or a lossy compression process. A lossless compression process may preserve the exact content but may not provide any compression and may yield poor compression ratios, for example when compressing photographs obtained from a digital camera or another image capturing device. A lossy compression process, like JPEG (Joint Photographic Experts Group), may be used to compress RGB images, but it may not be suited for printing as the lossy compression process does not preserve edges. Other lossy compression processes may be used to compress rasterized pages having a minimum compression ratio but may not preserve white or gray pixels, thereby degrading the overall image quality after compression.

Another compression process, referred to as RGB compression process, may include a two-stage process including a first stage performing a lossy fixed length compression format and a second stage performing a lossless variable rate compression. The RGB compression process is applied to a predefined region of the image to be compressed, and each region is subjected to the compression to compress the entire image. The predefined region may also be referred to as a cell of the image to be compressed, and, in some examples, a 4×4 RGB pixel cell may be considered.

Figure 1A:
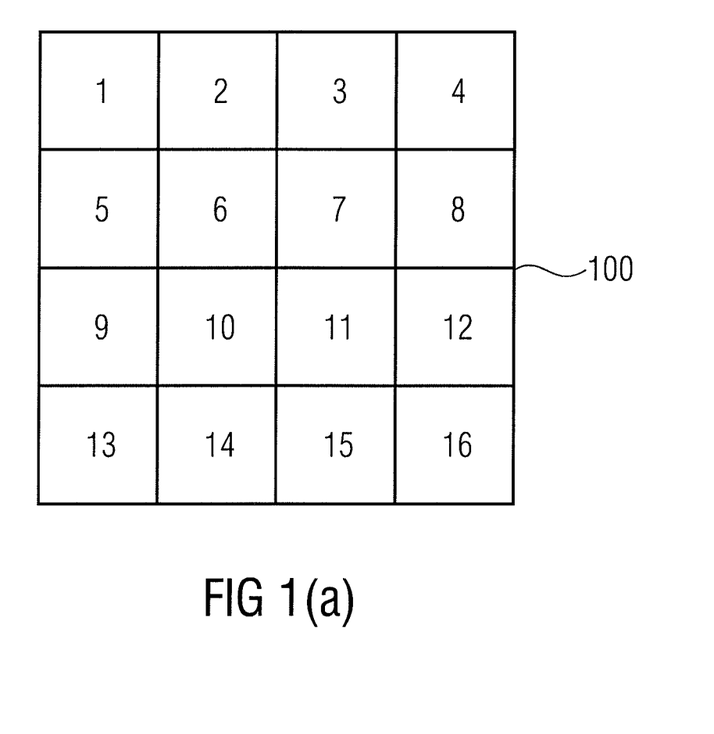
FIG. 1(a) shows an example of a 4×4 RGB pixel cell of an image to be compressed.

FIG. 1(a) shows an example of a 4×4 RGB pixel cell 100 of an image to be compressed. The 4×4 RGB pixel cell 100 includes pixels 1 to 16. The 4×4 RGB pixel cell 100 may include up to 16 different RGB colors, i.e. each of the pixels 102 may have a different color. Each pixel in the uncompressed 4×4 RGB pixel cell 100 may be described by its respective R value, G value and B value indicative of the color of the pixel, e.g., by the RGB colors $RGB_1$ to $RGB_{16}$. In some examples, an RGB color may be described by four bytes, the bytes representing red (R), green (G), blue (B) and an alpha value which indicate the opacity of the pixel. In other examples, the RGB color may comprise three bytes representing red (R), green (G), blue (B). The size of the uncompressed 4×4 RGB pixel cell 100 is 64 bytes.

Figure 1B:
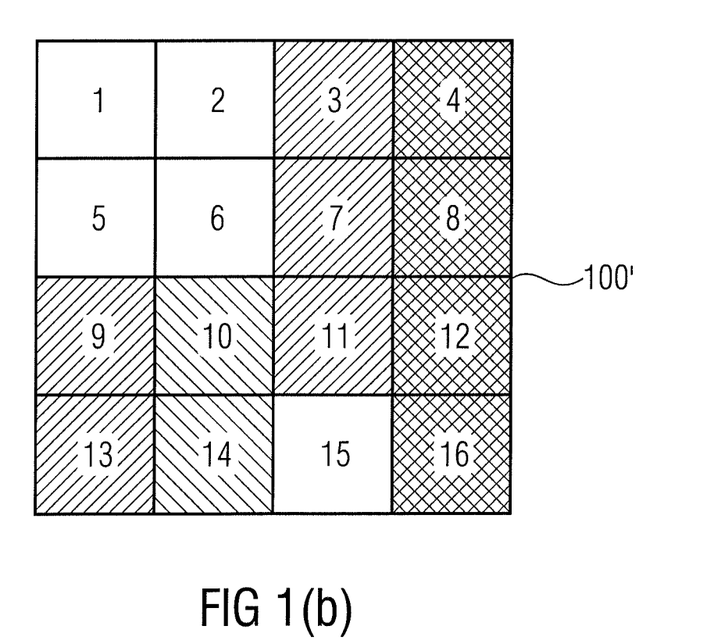
FIG. 1(b) shows an example of the 4×4 RGB pixel cell of FIG. 1(a) truncated to four different RGB colors.

In the first stage of the RGB compression process each 4×4 RGB pixel cell 100 of the image to be compressed is truncated into four or fewer colors, and described by the colors and a mask that has two bits for each of the pixels indicating which of the four possible RGB colors that pixel is mapped to. FIG. 1(b) shows an example of the 4×4 RGB pixel cell truncated to four different RGB colors. In the example shown in FIG. 1(b) pixels 1, 2, 5, 6 and 15 are truncated into a first color $RGB_1$ so that these pixels are now represented by the same first color. Pixels 3, 7, 9, 11 and 13 are truncated into a second color $RGB_2$, pixels 10, and 14 are truncated into a third color $RGB_3$, and pixels 4, 8, 12 and 16 are truncated into a fourth color $RGB_4$. The truncated 4×4 RGB pixel cell 100' may be described by 16 bytes including four bytes for a mask indicating for each of the 16 pixels which of the four colors is selected (16 pixels×2 bit/pixel) plus the 12 bytes for the four RGB colors $RGB_1$ to $RGB_4$. The first stage of the RGB compression process may yields a 4:1 compression ratio reducing the original size of 64 bytes of the 4×4 RGB pixel cell in FIGS. 1(a) to 16 bytes of the truncated 4×4 RGB pixel cell 100'.

In the second stage the RGB compression process may perform a lossless variable rate compression yielding an efficient coding for the truncated 4×4 RGB pixel cell 100' depicted in FIG. 1(b). The truncated 4×4 RGB pixel cell 100' in FIG. 1(b) may be encoded using between 1 byte and 17 bytes with the first byte describing the number of different colors the truncated 4×4 RGB pixel cell 100' contains and the color combinations in the truncated 4×4 RGB pixel cell 100'. The first byte may be followed by additional data in case gray pixels or color pixels are present. The color combinations in the truncated 4×4 RGB pixel cell 100' may be such that one white or black pixel is provided in the truncated 4×4 RGB pixel cell 100'. No additional value is provided for such a pixel. Up to four gray pixels may be in the truncated 4×4 RGB pixel cell 100'. A gray pixel is described by one additional byte to store the gray pixel value. Up to four RGB pixels may be in the truncated 4×4 RGB pixel cell 100' described by three bytes of additional data for describing the color. For example, when the original or uncompressed 4×4 RGB pixel cell 100 is truncated such that the truncated 4×4 RGB pixel cell 100' includes black or white, the lossless variable rate compression may yield a code describing the truncated 4×4 RGB pixel cell 100' by one byte indicating that a single color is included in the truncated 4×4 RGB pixel cell 100' and the color combination indicates that the color is white or black. When the 4×4 RGB pixel cell 100 is truncated into a four color truncated 4×4 RGB pixel cell 100', like in FIG. 1(b), the lossless variable rate compression may yield a code describing the truncated 4×4 RGB pixel cell 100' by a code having 17 bytes. The first byte describes that four different colors are in the truncated 4×4 RGB pixel cell 100' and that the color combination includes four different colors $RGB_1$ to $RGB_4$. The next four bytes encode the pixel mask. The four different colors $RGB_1$ to $RGB_4$ are each represented by three bytes, thereby yielding an overall size of the code of 17 bytes.

The RGB compression process may be applied to the entire image to be compressed or may be applied to a part of an image, which is to be compressed partially. The RGB compression process may apply a run-length coding of identical cells using, for example, two-byte codes.

The above described two-stage RGB compression process provides for a coding format that allows coding white and gray levels while providing for a good compression ratio of, for example, 4:1. Preserving, for example, white background pixels may be used for printing applications to yield better edges of objects and to avoid tainting the background. Preserving gray colors may be used to avoid hue shifts occurring in the neutral axis.

The techniques described herein provide an efficient image compression while preserving a predefined color, like white, black, gray or any other RGB color, while yielding a good image quality with a decent amount of computation. The techniques described herein allow to determine a suitable process to reduce a predefined region of an image to be compressed, for example a 4×4 RGB pixel cell with, for example, up to 16 RGB colors, down to a lower number of colors, for example down to four colors, as described above, in combination with a fixed length compression format for optimizing image quality and preserving a predefined color, like white, black, gray or any other RGB color, with a reasonable amount of computation.

Figure 2:
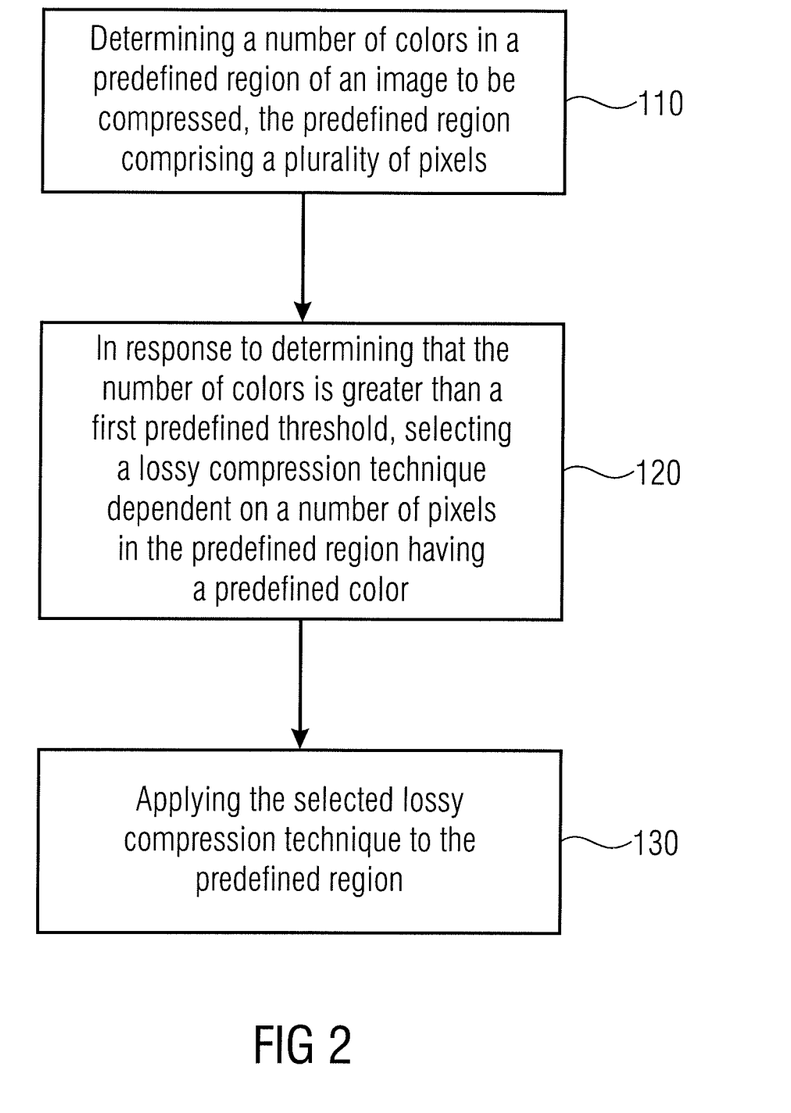
FIG. 2 shows a flow diagram of an example of a method for an image compression.

FIG. 2 shows a flow diagram of an example of a method for an image compression. At 110 a number of colors in a predetermined region of an image to be compressed is determined, the predetermined region comprising a plurality of pixels. At 120, in response to determining that the number of colors is greater than a first predefined threshold, a lossy compression process is selected dependent on a number of pixels in the predefined region having a predefined color. At 130 the selected lossy compression process is applied to the predefined region.

In some examples, the method described above may be repeated for each of a plurality of predefined regions of the image to be compressed until a part of the image or the entire image has been compressed. Applying the selected lossy compression process to the predefined region may include the above described lossless variable rate compression describing by a variable number of bytes the number of colors in the predefined region, the color combination in the predefined region and the values describing or defining the colors in the predefined region.

In the following, examples will be described with reference to the preservation of white as the predefined color; however, the method described herein may also be applied to other predefined colors, like black, a gray level or anyone of the RGB colors. Further, the following examples will be described with reference to a 4×4 RGB pixel cell as one example of the predefined region of the image to be compressed. Other examples may use regions of the image to be compressed having different dimensions including more or fewer pixels. Instead of a square region, the predefined region may have another shape, e.g. a rectangular shape or any polygonal shape.

In some examples, the lossy compression process selected at 120 in FIG. 2 may comprise an interpolation compression mode, a clustering compression mode or a block truncation compression mode.

Figure 3A:
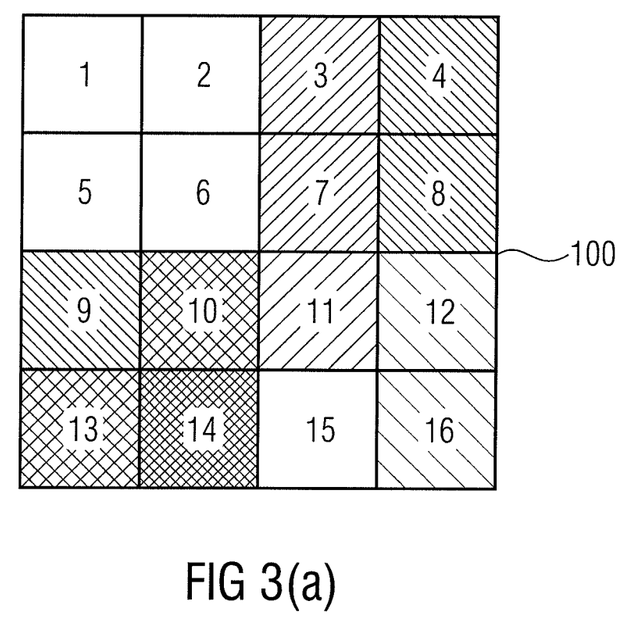
FIG. 3(a) shows an original 4×4 RGB pixel cell having 16 pixels.
Figure 3B:
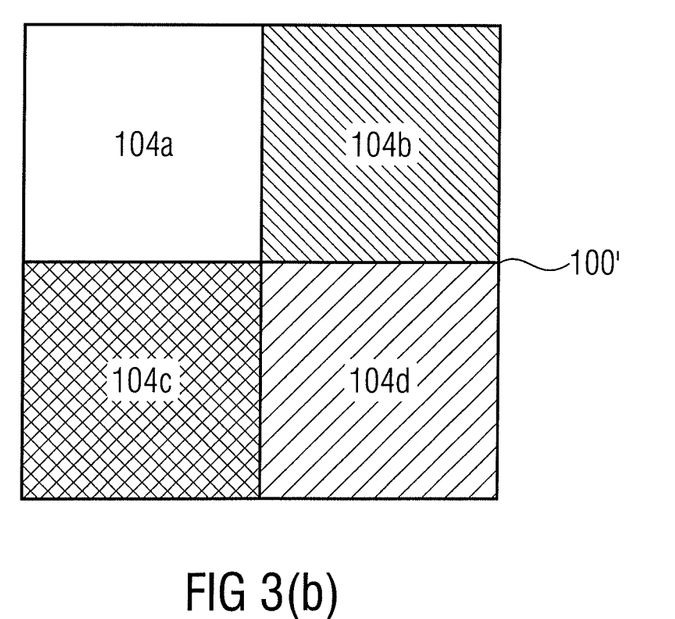
FIG. 3(b) shows the downsampled 4×4 RGB pixel cell having 4 pixels.

FIG. 3 shows an example of the interpolation compression mode, wherein FIG. 3(a) shows the original 4×4 RGB pixel cell 100 having 16 pixels of different colors. The interpolation compression mode may downsample the pixels of the 4×4 RGB pixel cell 100 by a predefined factor, for example a factor of 2, which results in the reduced or truncated 4×4 RGB pixel cell 100' shown in FIG. 3(b) including the four quadrants 104a to 104d. The first quadrant 104a includes pixels 1, 2, 5 and 6, the second quadrant 104b includes pixels 3, 4, 7 and 8, the third quadrant 104c includes pixels 9, 10, 13, 14, and the fourth quadrant 104d includes pixels 11, 12, 15 and 16. Each of the quadrants 104a to 104b is reduced to a single color as is shown in FIG. 3(b). The interpolation compression mode may be used for cells with gradual color changes, like in natural images.

Figure 4A:
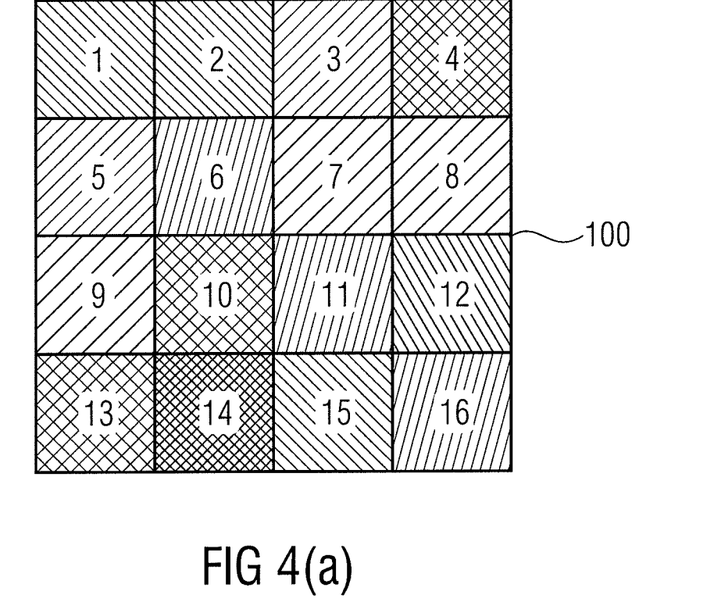

FIG. 4 shows an example of the clustering compression mode. FIG. 4(a) shows the original 4×4 RGB pixel cell 100 with 16 pixels, each pixel having a color described by the R value, the G value and the B value, also referred to as the RGB value of the pixel. In the clustering compression mode pixels of similar colors are clustered together. A cluster is defined as a range of R values, G values and B values within a maximum distance. Pixels are treated as pixels of similar color in case they have each of the individual R values, G values and B values within a threshold distance from each other. Such pixels of similar colors are clustered together. In some examples, the clustering compression mode may apply a single pass process in which the first pixel in the original 4×4 RGB pixel cell 100 defines the first cluster. When the R value, the G value and the B value of the second pixel are less than the threshold distance apart from the R value, the G value and the B value of the first pixel, the second pixel is added to the cluster and the cluster RGB boundaries are updated using at least the R value, the G value and the B value of the second pixel. When any of the R value, the G value and the B value of the second pixel is further apart than the threshold, a new cluster is made. This process continues for all pixels in the cell, and the color of each cluster is computed as the mid-point of the cluster boundaries.

Figure 4B:
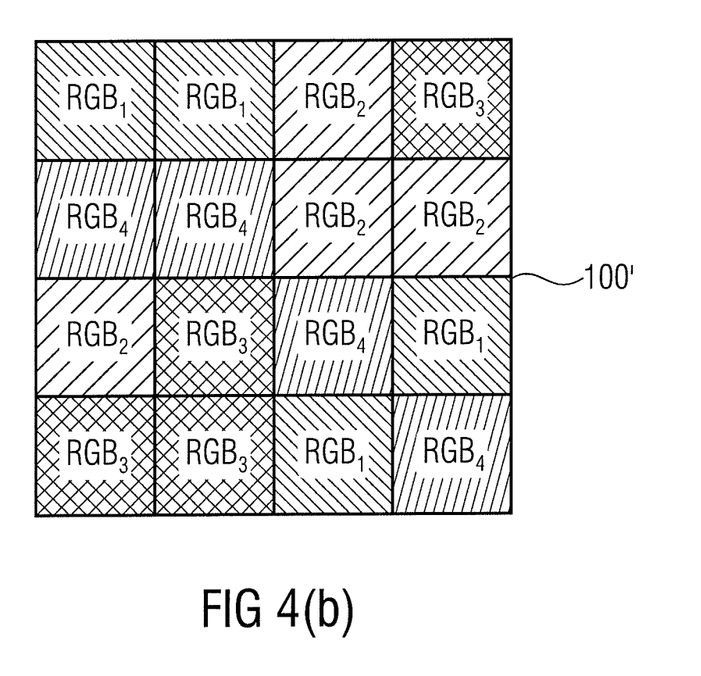
FIG. 4(b) shows the clustered 4×4 RGB pixel cell reduced to four colors.

FIG. 4(b) shows the clustered 4×4 RGB pixel cell 100' obtained by the clustering compression mode in an example when starting from the original 4×4 RGB pixel cell 100 shown in FIG. 4(a). In the example of FIG. 4(a) pixels 1, 2, 12 and 15 are considered similar, are clustered together and are represented by a color $RGB_1$ that is computed as the mid-point of the cluster boundaries. For example, the R value, the G value and the B value are set to the mid-point of the cluster. Likewise, pixels 3, 7, 8 and 9, pixel 4, 10, 13 and 14, and pixels 5, 6, 11 and 16 are clustered together and are represented by a common color $RGB_2$, $RGB_3$ and $RGB_4$, respectively.

Figure 5A:
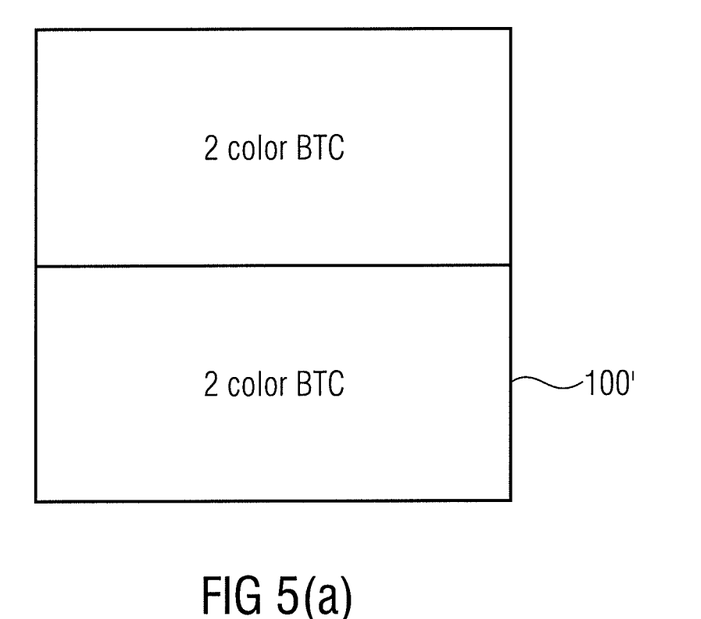
Figure 5B:
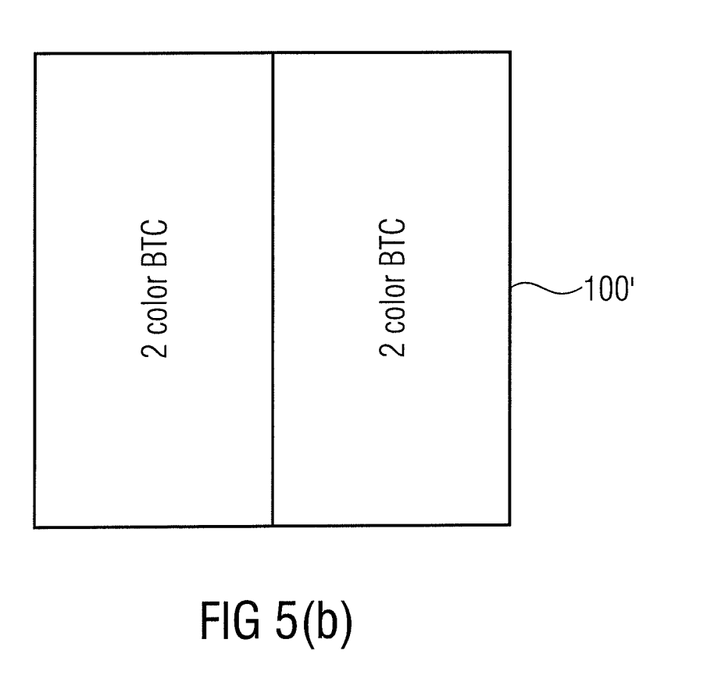

FIG. 5 shows an example for the block truncation compression mode. In this mode the original 4×4 RGB pixel cell, not depicted in FIG. 5, may be split into two halves, either top/bottom as is shown in FIG. 5(a) or left/right as is shown in FIG. 5(b). Each half-cell is reduced to two colors using, for example, the Block Truncation Coding (BTC) process that classifies the pixels into two buckets based on the luminance. In some examples, the reduction of the respective half-cells may be performed by applying another coding process.

In some examples, a further compression may be achieved by merging colors which are closer together than a predefined distance, for example colors may be merged together when the following condition is met $|R_0-R_1|+|G_0-G_1|+|B_0-B_1|<\text{Distance}$, with
$R_0, G_0, B_0$=RGB values of the first color,
$R_1, G_1, B_1$=RGB values of the second color,
Distance=predefined maximum distance between the colors to be merged.

This additional compression mode may be applied to the above mentioned interpolation, clustering and block truncation compression modes.

Figure 6:
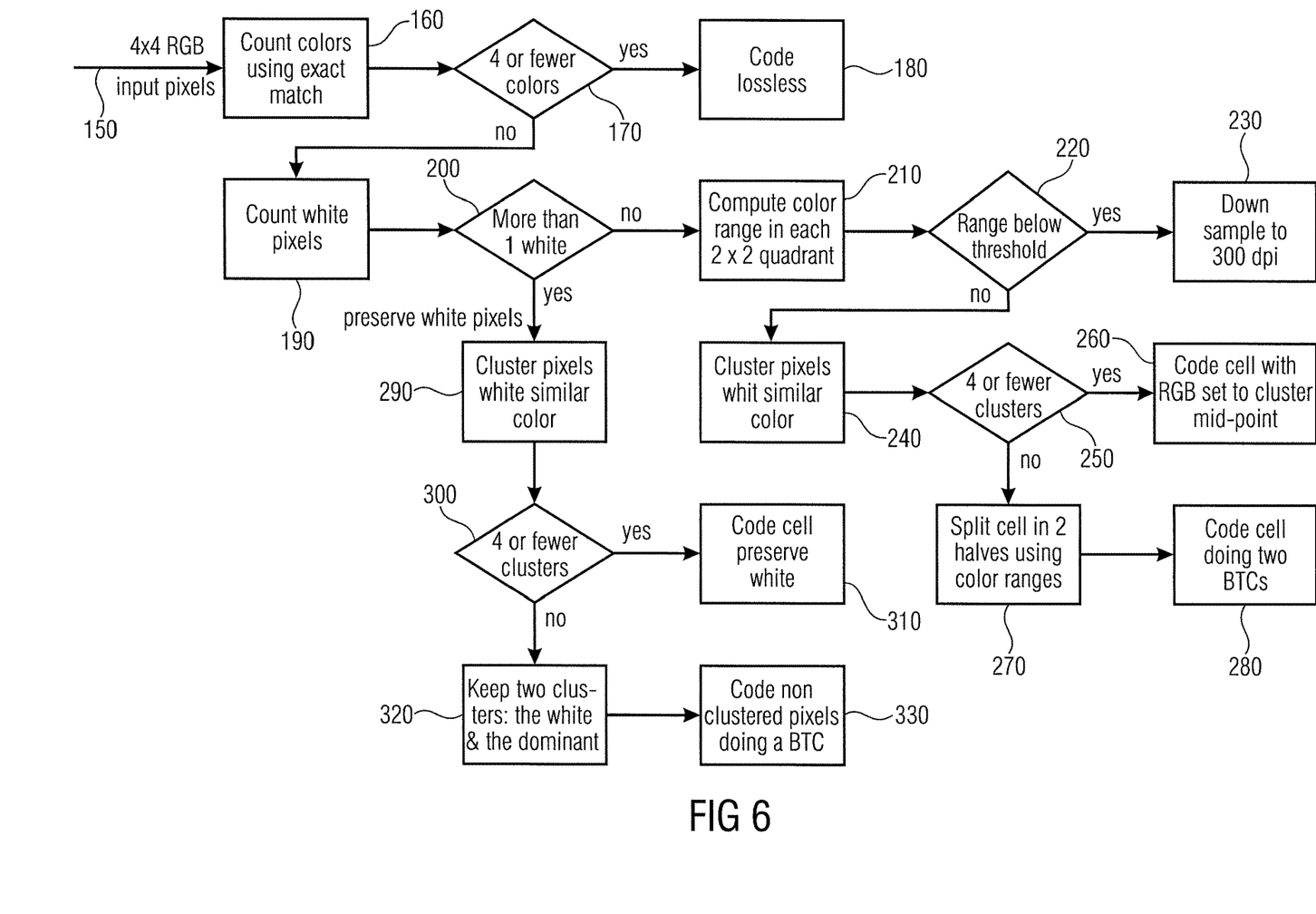
FIG. 6 shows a flow diagram of an example for selecting a lossy compression process for compressing an image or a cell of an image while preserving a predefined color.

FIG. 6 shows an example for selecting the lossy compression process to be used for compressing an image or a part of an image while preserving white.

In FIG. 6, the input pixels of an uncompressed or original 4×4 RGB pixel cell are received at 150. Block 160 counts the different colors in the 4×4 RGB pixel cell using, e.g., an exact match. Block 170 determines whether the number of colors is four or fewer colors. When four or fewer colors are found in the 4×4 RGB pixel cell, the 4×4 RGB pixel cell is lossless encoded using the exact colors by block 180. Block 180 may apply a suitable lossless compression process for coding the four colors. For example, the above described two-stage RGB compression process may be applied, and in the first stage the 4×4 RGB pixel cell having four or fewer colors is described by these colors and the mask with two bits for each of the 4×4 pixels indicating which of the four colors the respective pixels are mapped to. The variable rate compression stage encodes the 4×4 RGB pixel cell using between 1 and 17 bytes as described above, dependent on the number of colors.

In some examples, block 180 may average pairs of non-gray, but similar colors that are separated by a predefined distance, thereby reducing the number of colors to encode with compression becoming lossy.

In case block 170 determines that there are more than four colors in the 4×4 RGB pixel cell, block 190 counts the number of white pixels. Block 200 determines whether the 4×4 RGB pixel cell includes more than a predefined number of white pixels or not. The predefined number may be a programmable threshold. In the example depicted in FIG. 6 the programmable threshold is one, and block 200 determines whether the 4×4 RGB pixel cell includes more than one white pixel or not.

In case block 200 finds none or just one white pixel in the 4×4 RGB pixel cell, white is treated as a regular color and a color non-preserving lossy compression process is selected treating white as any other color in the 4×4 RGB pixel cell. In some examples, at least one of the above described interpolation compression mode, clustering compression mode and block truncation compression mode may be applied. In some examples another color non-preserving lossy compression process may be applied which treats all of the colors in the 4×4 RGB pixel cell equally.

Block 210 calculates the color range for a plurality of sections in the 4×4 RGB pixel cell. In an example, the 4×4 RGB pixel cell may be separated into a plurality of 2×2 pixel quadrants which yields the four quadrants 104a-104d described above with reference to FIG. 3(b). The color range of each of the 2×2 pixel quadrants 104a-104d is calculated, for example as $\max[R_{max}-R_{min}, G_{max}-G_{min}, B_{max}-B_{min}]$. Block 220 determines whether the range of all four quadrants 104a-104d is below a low contrast threshold which may be set, in an example, to a value of 18. When block 220 determines that the range of all of the quadrants 104a-104d is below the threshold, block 230 applies the interpolation compression mode is applied and the 4×4 RGB pixel cell is reduced to four colors by downsampling the 4×4 RGB pixel cell to a reduced resolution, for example from 600 dpi to 300 dpi, by averaging the color of the four pixels in each of the 2×2 quadrants 104a-104d yielding a cell as shown in FIG. 3(b) above. In some examples, a further color reduction may be applied when the ranges of the individual quadrants are close to each other, for example when the respective colors are closer than a predefined distance:

$|R_0-R_1|+|G_0-G_1|+|B_0-B_1|<\text{Distance}$, with
$R_0, G_0, B_0$=RGB values of the first color,
$R_1, G_1, B_1$=RGB values of the second color,
Distance=predefined distance between the colors.

In case block 220 determines that there is any of the four quadrants 104a-104d with a range beyond the threshold, block 240 applies above-described clustering compression mode for clustering pixels with a similar color. Block 250 determines whether block 240 generated four or fewer clusters. In case block 240 generated four or fewer clusters, block 260 codes the 4×4 RGB pixel cell using the RGB color for each of the clusters set to the cluster mid-point. When it is determined that block 240 generated more than four clusters, block 270 applies the block truncation compression mode splitting the 4×4 RGB pixel cell into two halves, either top/bottom (see FIG. 5(a) above) or left/right (see FIG. 5(b) above). The splitting is performed using at least the color ranges computed for each of the quadrants 104a-104d by block 210 and by looking for a 2×4 pixel block that has the smallest color range. After splitting the 4×4 RGB pixel cell, block 420 reduces each half cell to two colors, for example by applying the Block Truncation Coding (BTC) process.

Turning our back to block 200, in case it is determined that there are two (or more) white pixels in the 4×4 RGB pixel cell, a color preserving lossy compression process is applied which treats white separate from the other colors in the 4×4 RGB pixel cell. Block 290 applies the above described clustering compression mode, with the white pixels defining the first cluster. Pixels that are nearly white, for example pixels that are within a predefined distance from the white color value, may be added to the white cluster. The remaining non-white pixels are treated as described above for generating further clusters.

Block 300 determines whether block 290 generated four or fewer clusters. In case four or fewer clusters were generated, block 310 encodes the 4×4 RGB pixel cell using a code value for the white color for the white cluster and code values for a color associated with the remaining clusters. The color of the remaining clusters may be calculated, as mentioned above, as the mid-point for the cluster.

In case block 300 determines that more than four clusters were generated by block 290, block 320 keeps or preserves the white cluster and a dominant cluster which may be the cluster having the most pixels following the clustering. Block 330 encodes the 4×4 RGB pixel cell using at least a code for the white cluster, using at least a color code for the dominant cluster generated as the mid-point of the dominant cluster, and the remaining non-clustered pixels are reduced to two colors using, for example, the Block Truncation Coding (BTC) process.

The process described above with regard to FIG. 6 allows for an image compression providing increased image quality and reduced computation while preserving a purified color, for example white. The process may provide for a minimum compression ratio of 4:1 while preserving the white pixels. The above examples have been described with reference to white pixels, but the process may also be applied to other colors, for example to black pixels, to a specific gray color or to a specific RGB color.

Figure 7:
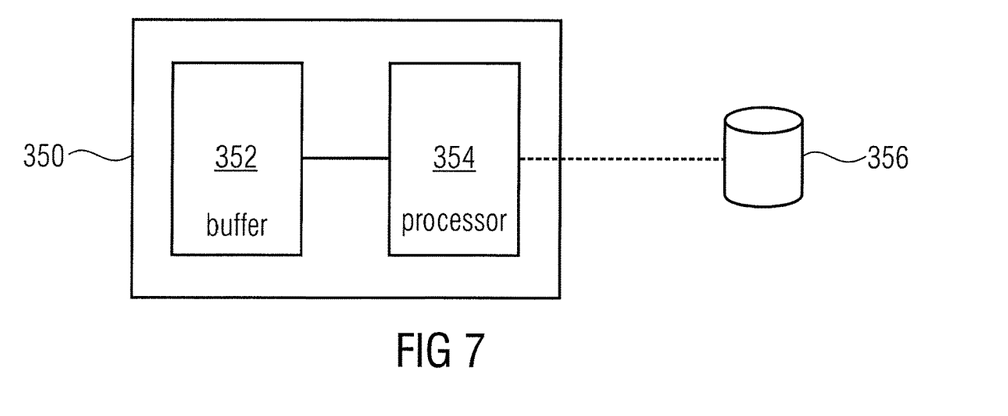
FIG. 7 shows a block diagram of an example of an apparatus for selecting a lossy compression process for compressing an image or a cell of an image while preserving a predefined color.

FIG. 7 shows a block diagram of an apparatus 350 including a buffer 352 for storing a predefined region of an image to be compressed, for example a 4×4 RGB pixel cell as mentioned above. The buffer 352 is connected to a processor 354, also referred to as a processing resource, to process the predefined region of the image as discussed in detail above. The apparatus 350 may be a computing device, for example a desktop computer, a microcontroller within a printer, a processor inside an image capturing device, e.g., a digital camera or a scanner, a GPU and ASIC, or the like. The apparatus 350 may be connected, in some examples, to an internal or external storage 356 to store the compressed image. In some examples, the process described above is repeated, for example by the processor 354, for each or for a plurality of the predefined regions of the image to be compressed so that, finally, the completely or partially compressed image may be stored.

Figure 8A:
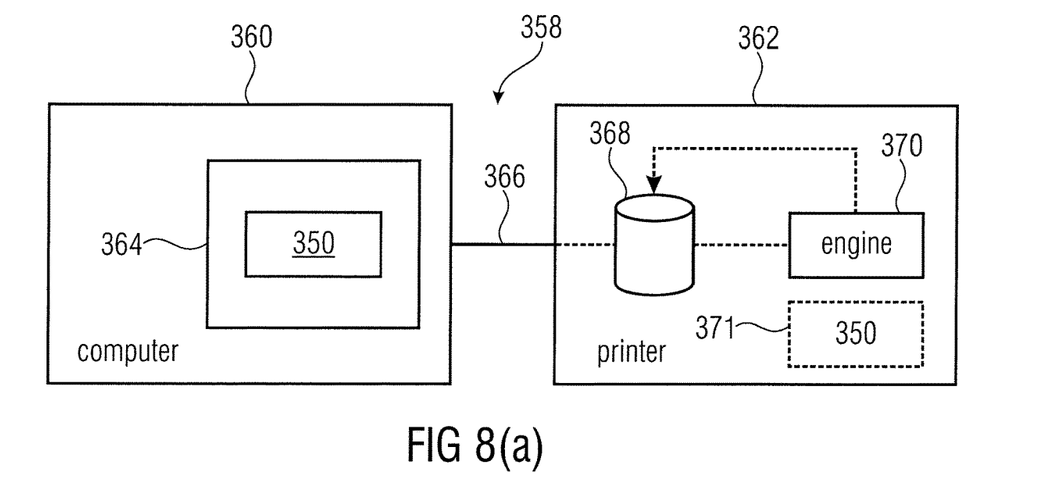
FIG. 8(a) shows an example of a printing pipeline including a computing device implementing the apparatus of FIG. 7.

FIG. 8(*a*) shows an example of a printing pipeline 358 including a computing device 360 external to a printer 362. The computing device 360 may include a printer driver or raster image processor (RIP) 364 including the apparatus 350 of FIG. 7 for selecting a lossy compression process for compressing an image or a cell of an image while preserving a predefined color. The image generated by the printer driver/RIP 364 is compressed by the above described process and forwarded to the printer 362 via a communications link 366. The compression may reduce the transmission time and may speed up the printing process. The printer 362 may be a 2D or 3D ink-jet printer, for example a page wide array (PWA) printer, including a substrate wide stationary printhead or group of printheads commonly referred to as a print bar, to print onto paper or other print substrates or print targets moving past the print bar. In other examples the 2D or 3D ink-jet printer may be a carriage printer having a carriage that is movable in a carriage scan direction substantially perpendicular to an advance direction of a print target, and carrying a printhead used to print on the paper or on another print substrate or print target over which the carriage moves. In some other examples, the printer may be an electrophotographic printer. The printer 326 may include a storage device 368, for example a disc drive, and a print engine 370 for generating the printout. The storage device 368 may be used for queuing print jobs or pages received, for example, from the computing device 360 in compressed. The storage device 368 may also be used for storing the print jobs and pages in compressed form for a reprinting. This will reduce the read/write time and the storage demand inside the printer 362.

In some examples, the apparatus 350 may be implemented inside the printer 362 as is how be the dashed block 371 in FIG. 8(*a*). The apparatus may also be implemented as part of the print engine 370.

Figure 8B:
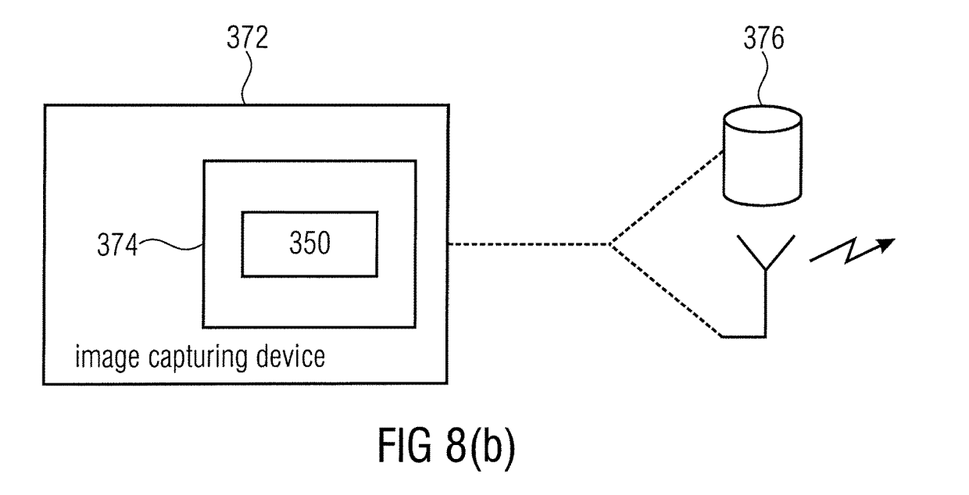
FIG. 8(b) shows an example of an image capturing device including the apparatus of FIG. 7.

FIG. 8(*b*) shows an image capturing device 372, for example a scanning device or a digital camera. The image capturing device 372 may include a processing section 374 implementing the apparatus 350 to allow the output of images captured by the device 372 in compressed form either to an internal or external storage 376 or for further processing. The compression may reduce the transmission bandwidth when transferring the image either for storage or for further processing. Also the storage demand when storing the image may be reduced. The compressed image may be transmitted for further processing or for storage via a wired or a wireless communications link as schematically shown at 378 of FIG. 8(*b*).

Although some aspects of the techniques described herein have been described in the context of an apparatus, these aspects may also represent a description of the corresponding method. Analogously, aspects described in the context of a method also represent a description of a corresponding feature of a corresponding apparatus.

All of the features disclosed in this specification, including any accompanying claims, abstract and drawings, may be combined in any combination. Each feature disclosed in this specification, including any accompanying claims, abstract and drawings, may be replaced by other features serving the same, equivalent or similar purpose, unless expressly stated otherwise. Thus, unless expressly stated otherwise, each feature disclosed is one example of a generic series of equivalent or similar features.

It would be appreciated that examples described herein may be realized in the form of hardware, machine readable instructions or a combination or hardware and machine readable instructions. Any such machine readable instructions may be stored in the form of volatile or non-volatile storage such as, for example, a storage device such as a ROM, whether erasable or rewritable or not, or in the form of memory such as, for example, RAM, memory chips device or integrated circuits or an optically or magnetically readable medium such as, for example, a CD, DVD, magnetic disc or magnetic tape. It would be appreciated that these storage devices and storage media are examples of machine readable storage that are suitable for storing a program or programs that, when executed, implement examples described herein.

The invention claimed is:

1. A method, comprising:
   determining a number of colors in a predefined region of an image to be compressed, the predefined region comprising a plurality of pixels;
   in response to determining that the number of colors is greater than a first predefined threshold, selecting a lossy compression process dependent on a number of pixels in the predefined region having a predefined color; and
   applying the selected lossy compression process to the predefined region.

2. The method of claim 1, wherein the selected lossy compression process comprises at least one of:
   interpolation including downsampling the pixels of the predefined region of the image to be compressed by a predefined factor into a plurality of sub-regions, each sub-region being reduced to one color;
   clustering pixels of similar colors, wherein a cluster is defined as a range of values defining a color within a maximum distance, wherein pixels of similar colors have each of their individual values defining the color of the pixel within a threshold distance; and
   block truncation including splitting the predefined region of the image to be compressed into a plurality of sub-regions, each sub-region being reduced to two colors.

3. The method of claim 2, wherein clustering pixels of similar colors comprises
   defining a first cluster by a first pixel in the predefined region of the image to be compressed,
   when all values defining the color of a second pixel of the predefined region are less than a threshold distance apart from the values defining the color of the first pixel, adding the second pixel to the cluster and updating the cluster color boundaries using at least the values defining the color of the second pixel,
   when any of the values defining the color of the second pixel of the predefined region is further apart from the values defining the color of the first pixel than the threshold a new cluster is made,
   repeating the process for all pixels in the predefined region, and
   computing the color of each cluster as the mid-point of the cluster boundaries.

4. The method of claim 2, wherein splitting the predefined region of the image to be compressed into a plurality of sub-regions comprises splitting the predefined region in two halves and reducing each half to two colors using the Block Truncation Coding (BTC) process classifying the pixels into two buckets based on their luminance.

5. The method of claim 1, wherein
   in case the number of pixels in the predefined region having the predefined color is equal to or greater than a second predefined threshold, selecting a color preserving lossy compression process, wherein the color preserving lossy compression process treats the predefined color separate from the other colors in the predefined region; and
   in case the number of pixels in the predefined region having the predefined color is less than the second predefined threshold, selecting a color non-preserving lossy compression process, wherein the color non-preserving lossy compression process treats the predefined color as any other color in the predefined region.

6. The method of claim 5, wherein applying the color preserving lossy compression process comprises:
   forming a first cluster by clustering together pixels of the predefined color in the predefined region, and
   forming at least one second cluster by clustering together pixels of colors different from the predefined color in the predefined region which have values defining the color of the pixel within a predefined range.

7. The method of claim 6, wherein
   in case the number of clusters is equal to or less than a third threshold, encoding the predefined region using at least a code value for the first cluster, and a code value for each of the second clusters determined using at least a mid-point color for the respective second cluster; and
   in case the number of clusters is greater than the third threshold, encoding the predefined region using at least
      a code value for the first cluster,
      a code value for a dominant cluster of the second clusters determined using at least a mid-point color for the dominant cluster, the dominant cluster being the cluster of the second clusters including the most pixels from the predefined region, and
      a code value obtained by reducing the colors of the remaining pixels in the predefined region to a predefined number of colors.

8. The method of claim 5, wherein the color non-preserving lossy compression process is selected using at least a color range of each of a plurality of sections of the predefined region of the image to be compressed.

9. The method of claim 8, wherein
   in case the color range of each of the plurality of sections of the predefined region is less than a fourth predefined threshold, applying the color non-preserving lossy compression process comprises:
      reducing the number of colors in the predefined region of the image to be compressed to a predefined number of colors;
   in case the color range of at least one of the plurality of regions of the predefined region is equal to or greater than the fourth predefined threshold, applying the color non-preserving lossy compression process comprises:
      clustering together pixels of colors in the predefined region which have color values within a predefined range.

10. The method of claim 9, wherein
    in case the number of clusters is equal to or less than a fifth threshold, applying the color non-preserving lossy compression process comprises:
       encoding the predefined region using at least a code value for the clusters determined using at least a mid-point color for respective clusters; and
    in case the number of clusters is greater than the fifth threshold, applying the color non-preserving lossy compression process comprises:
       splitting the predefined region into a plurality of sub-regions, and
       encoding the predefined region using at least a code value obtained by reducing the colors of the pixels in each sub-region of the predefined region to a predefined number of colors.

11. The method of claim 1, comprising
    repeating the process for each of the predefined regions of the image to be compressed, and
    storing or processing the compressed image.

12. The method of claim 1, wherein the predefined region of the image to be compressed comprises a 4×4 RGB pixel cell, and applying the selected lossy compression process comprises reducing the 4×4 RGB pixel cell from 16 pixels that has up to 16 different RGB colors down to 4 or fewer colors.

13. A non-transitory machine-readable storage medium comprising instructions executable by a processing resource of a computing device to cause the processing resource to
    determine a number of colors in a predefined region of an image to be compressed, the predefined region comprising a plurality of pixels;
    select, in response to determining that the number of colors is greater than a first predefined threshold, a lossy compression process dependent on a number of pixels in the predefined region having a predefined color; and
    apply the selected lossy compression process to the predefined region.

14. An apparatus, comprising:
    a buffer to store a predefined region of an image to be compressed; and
    a processor to
       determine a number of colors in a predefined region of an image to be compressed, the predefined region comprising a plurality of pixels;
       select, in response to determining that the number of colors is greater than a first predefined threshold, a lossy compression process dependent on a number of pixels in the predefined region having a predefined color; and apply the selected lossy compression process to the predefined region.

15. The apparatus of claim 14, wherein the apparatus comprises at least one of a printer driver,
a raster image processor of a printing system,
a printer, and
an image capturing device.

* * * * *